Figure 1:
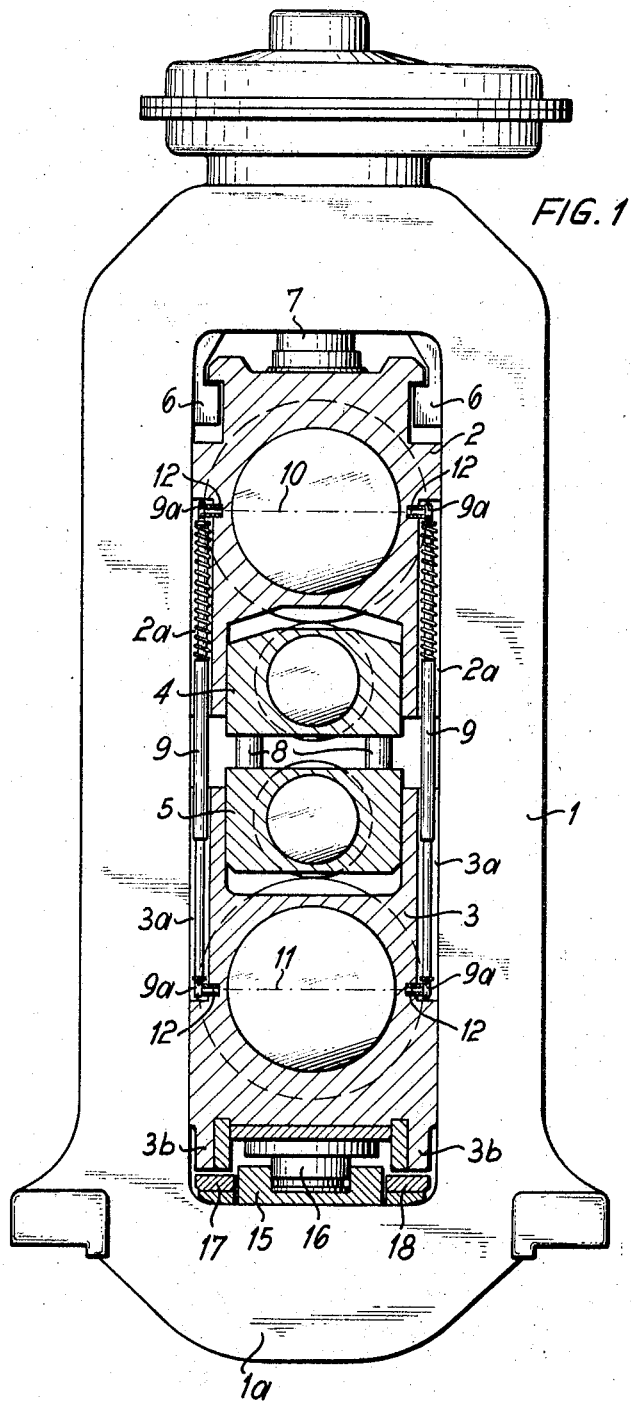

Nov. 21, 1967  K. J. NEUMANN ETAL  3,353,385
ROLL GAP MEASURING DEVICE
Filed July 7, 1964

United States Patent Office 3,353,385
Patented Nov. 21, 1967

3,353,385
ROLL GAP MEASURING DEVICE
Karl Josef Neumann, Wallerfeldstrasse 2, and Hans Siegfried Metzger, Auf der Teufelsinsel 33, both of St. Ingbert, Saar, Germany
Filed July 7, 1964, Ser. No. 380,956
1 Claim. (Cl. 72—21)

This invention relates to a control arrangement for setting and for continuously measuring and adjusting the rolling gap in rolling mills, and more particularly to a control arrangement including a control gauge for registering the measurement values to provide an automatic rolling gap control in the rolling frames. This problem has not been solved heretofore in a satisfactory manner. Thickness gauges operate in a reasonably exact manner but with a time delay which depends on the rolling speed and on the distance of the thickness gauge from the rolling frame. The pressure gauges indicate the conditions in a rolling gap directly but their exactness is not sufficient for very precise requirements. Sensing devices are also known for the purpose of measuring the rolling gap, such devices being provided with a sensing element or probe which engages the roll pins. Aside from the reduced accuracy of the measurement results due to oil films or the like, the measurements may also be falsified due to the roll deflections.

It is therefore an object of the invention to provide a simple and dependable measuring device for setting and for continuously measuring and adjusting the rolling gap in rolling mills, this device being largely independent from the roll deflections and which may be easily re-adjusted in view of the amount of grinding which may be carried out on the rolls. The measuring devices according to the invention is based on the concept of measuring the distance between oppostie chucks and consists of telescopically assembled, longitudinally slideable measuring tubes which engage opposite chucks, and one of the tubes which is associated with one of the chucks carries a differential transformer, and the tube associated with the other chuck supports a motor driven adjusting device for the iron core extending into the differential transformer. In order to eliminate as much as possible the effect of the tilting movement of the chucks during roll deflection the measuring tubes are pivotally connected on pins which are inserted into the chucks in their horizontal tilting plane, the measuring tubes extending through grooves which are worked into the lateral guide surfaces of the chucks. It it sufficient to provide a pair of measuring tubes on one of the frame sides. This pair of measuring tubes is preferably arranged on the fixed bearing side of the rollers, which is also usually the servicing side of the rolling frame. In this manner the measurement results are not falsified or distorted by a transverse displacement of the chucks to which the measuring tubes are connected.

Figure 2:
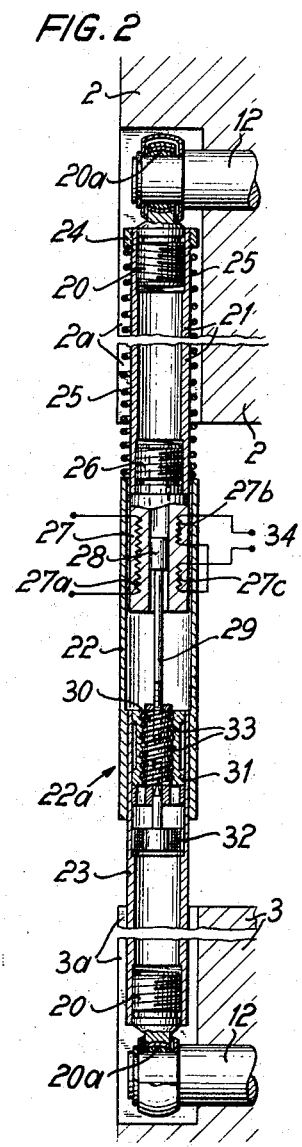

The invention will be described hereafter in greater detail by means of an embodiment according to the invention and with reference to the accompanying drawing in which:

FIG. 1 shows a side view of a four-high hot rolling mill frame from the servicing side, with a section of the chucks in the vertical plane of the grooves showing the measuring tubes and FIG. 2 shows a section through a measuring tube, on an enlarged scale.

The rolling mill frame shown in the drawing has two frame stands 1 with an upper chuck 2 and a lower chuck 3 for the backing rolls, the chucks 4 and 5 for the work rolls being guided in the chucks 2 and 3. The upper chucks 2 are drawn by means of a device 6, not shown in detail, against the upper adjusting spindle 7 in order to obtain a weight balance. The work roll chucks 4 and 5 are balanced by means of hydraulic expansion pistons 8.

For setting and continuously measuring the rolling gap a pair of telescopic, longitudinally slideable measuring tubes 9 are provided, which are pivotably connected to the chucks 2 and 3 at the level of their horizontal tilting planes 10 and 11. To provide this pivotable connection, studs or pins 12 are inserted into the chucks 2 and 3 at the level of the planes 10 and 11, and the measuring tubes 9 with their eyes 9a engage these studs. The measuring tubes 9 extend within the width of the windows of the stands 1 in grooves 2a and 3a of the backing roll chucks 2 and 3, the grooves 2a and 3a being worked into the lateral guide surfaces of the chucks. The form and manner of locating the measuring tubes 9 allows existing rolling frames to be provided easily and at small cost with a measuring device according to the invention.

The measurement values of the measuring tube 9 illustrated in greater detail in FIGURE 2 may be used in an automatic rolling gap adjusting arrangement for rotating the adjusting spindle 7. But it is preferred to employ a sensitive hydraulic adjusting arrangement for a regulation during the rolling operation, and such a hydraulic adjusting arrangement is commonly employed in addition to the adjusting spindles and serves to adjust the lower chucks 3. This type of hydraulic adjusting arrangement is illustrated in FIGURE 1 for an existing frame which is to be changed over, and consists of a hydraulic cylinder 15 which is supported on the lower cross-beam 1a of the stand, and of a pressure piston 16 which acts on the lower chuck 3. On the side of cylinder 15 a pull-out sled 17, 18 is arranged on which the projecting parts 3b of the chuck 3 may be set down on an intermediate stack of metal sheets so that the set of rolls may be removed laterally from the frame without causing the clamping or distortion of the piston 16.

In the enlarged section of FIGURE 2 the backing roll chucks 2 and 3 with their pins 12 and the grooves 2a and 3a are shown in a vertically reduced form. The measuring tube is connected at its ends by a plug 20 threaded into the tube, the plugs 20 being formed so as to provide at the pins 12 a universally movable ball joint 20a.

The actual measuring tube consists of an inner tubular member or tube 21 associated with the upper chuck 2 and slideably received in an outer tubular member or tube 22a which is associated with the lower chuck 3 and which consists of two tube sections 22 and 23. The tube section 23 is received partly in tube section 22 and both tubes are secured together by welding. A compression spring 25 is lodged between the collar 24 of the inner tube 21 and the upper face of the tube section 22, which spreads apart the telescoping tubes 21 and 22a so as to provide an equalization of the play in the ball joints 20a at each end.

A differential transformer 27 having a primarly coil 27a and secondary coils 27b and 27c is fixed to the inner tube 21 by a plug 26. An iron core 28 extends into the differential transformer 27 and is connected over a rod 29 with a longitudinally adjustable spindle 30. This spindle 30 is movable in a nut 31 which is fixed to the tube section 23. The tube section 23 receives also the electric motor 32 for rotating the spindle 30. In the embodiment shown the mechanical adjusting device 30, 31 for the iron core 28 comprises a known spindle arrangement including rotary balls 33. Such ball spindles are characterized in that they require no servicing and are practically without play.

The operation of the measuring device according to the invention is as follows: When a set of rolls provided with measuring tubes 9 is mounted in position, the iron core 28 of the differential transformer 27 may assume any desired position relative to the secondary coils 27b and 27c depending on the rolling gap set by means of the pressure spindle 7. By means of the adjusting device 30, 31, 32 the iron core 28 is adjusted until it is located in the zero position shown in FIGURE 2 in which the currents of the secondary coils are balanced so that a zero indication is present at the outlet 34 of the measuring device. During the rolling operation any change of the rolling gap has the effect of moving the inner tube 21 relative to the outer tube 22a so that the position of the iron core relative to the secondary coils of the differential transformer 27 is also varied. A signal is thus emitted at 34 which causes through the control arrangement a pressure change in the cylinders 15 so that the signal at 34 returns to zero. In this way the distance between the pins 12 and thus between the chucks 2, 3 and finally between the backing rolls is maintained constant. The elastic deformations of the parts between the rolling gap and the pins 12, which are not encompassed by the measuring results, are reduced to a minimum. These deformations may also be taken into consideration by an overcompensation which depends on the rolling pressure.

The slow changes of the rolling gap, for example due to wear of the rolls or due to heating of the rolls, may be recorded by a thickness gauge which acts upon the adjusting device 30, 31, 32, and which moves the iron core 28 until in its zero position the stock is within permissible rolling tolerances.

When a pair of measuring tubes 9 are arranged on one side of a frame it is appropriate to compare the results of both measuring devices in order to obtain an average value. As the chucks cannot be mounted in the windows of the stands so as to be entirely free of play, it is not possible to prevent completely any rotating movement of the chucks around the roller axes, so that this would lead to unequal measurement results in the two measurement tubes. The averaging of the measurement results eliminates this inaccuracy.

What is claimed is:

A roll gap measuring device for a rolling mill having upper and lower means for supporting upper and lower rolls respectively, said upper and lower rolls supporting means being arranged for relative vertical movement whereby the vertical spacing therebetween is determinative of said roll gap comprising, in combination, at least one pair of tubular members arranged in telescoping sliding relationship, means for pivotally mounting said pair of tubular members at opposite ends on said upper and lower rolls supporting means respectively for telescoping sliding movement of said tubular members corresponding to the relative vertical movement of said upper and lower rolls supporting means, a differential transformer having an axially movable core supported on one of said tubular members for producing an output signal corresponding to the axial position of said core, adjustable means supported on the other of said tubular means for supporting said differential transformer core on said other tubular member for simultaneous movement therewith, said adjustable means including an electric motor and means including a support rod for drivably connecting said core to said electric motor for axial movement of said core within said differential transformer independently of the telescoping sliding movement of said tubular members.

References Cited

UNITED STATES PATENTS

| | | | |
|---|---|---|---|
| 1,953,165 | 4/1934 | George | 72—243 |
| 2,601,792 | 7/1952 | Dahlstrom | 72—21 |
| 2,903,926 | 9/1959 | Reichl | 72—243 |
| 3,080,490 | 3/1963 | Newcomb | 72—29 |
| 3,089,081 | 5/1963 | Brosh | 336—136 |
| 3,096,670 | 7/1963 | Stringer | 72—243 |
| 3,124,982 | 3/1964 | Neumann | 72—21 |
| 3,208,251 | 7/1965 | Hulls et al. | 72—11 |
| 3,217,240 | 11/1965 | Grant et al. | 336—136 |
| 3,235,790 | 2/1966 | Collins | 336—136 |
| 3,246,496 | 4/1966 | Halben | 72—21 |
| 3,247,697 | 4/1966 | Cozzo. | |

CHARLES W. LANHAM, *Primary Examiner.*

RICHARD J. HERBST, *Examiner.*

A. RUDERMAN, *Assistant Examiner.*